Patented Nov. 7, 1922.

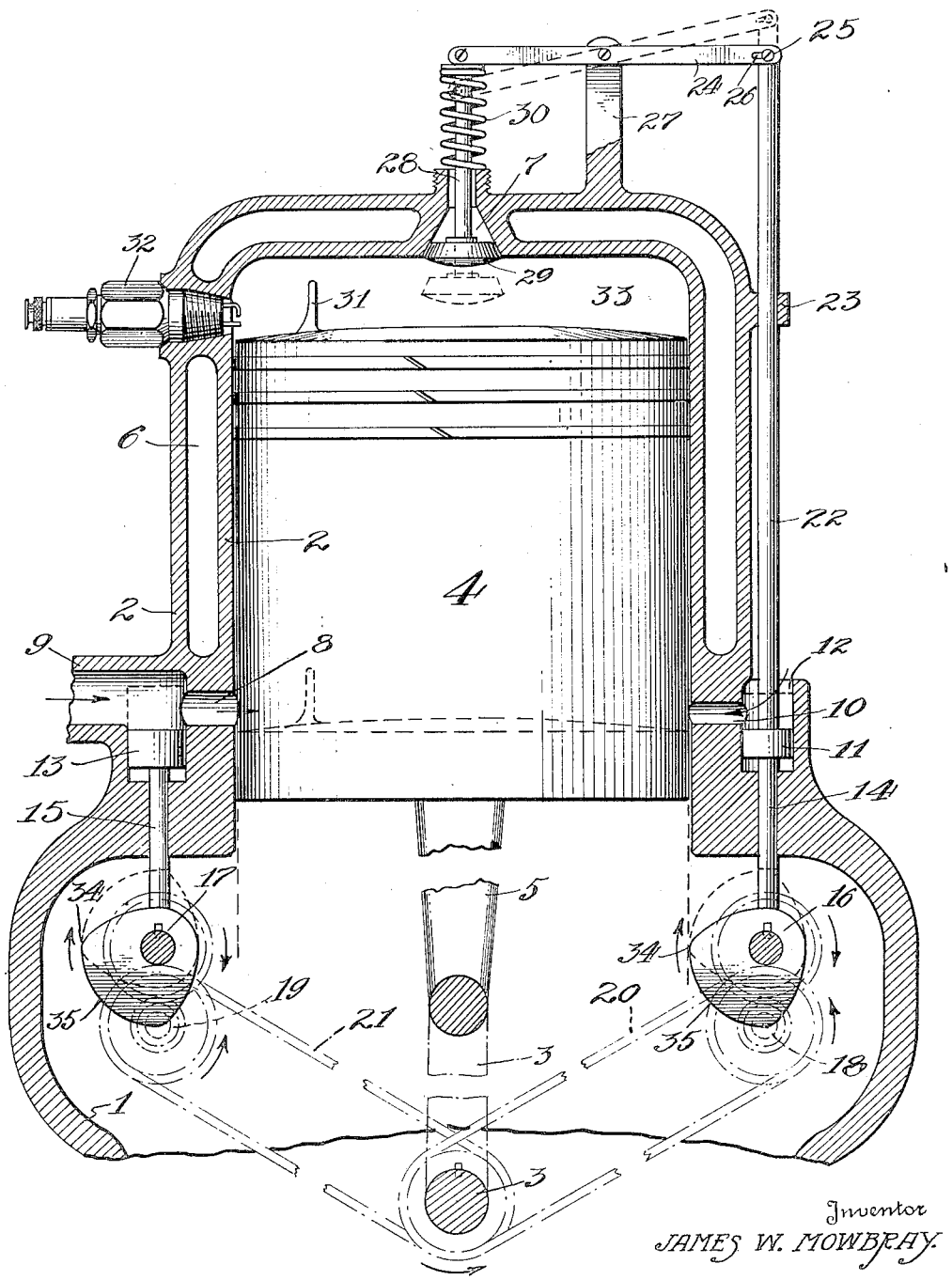

1,434,448

UNITED STATES PATENT OFFICE.

JAMES W. MOWBRAY, OF WINDSOR, ONTARIO, CANADA, ASSIGNOR TO DAVID A. STEWART, OF LISTOWEL, ONTARIO, CANADA.

INTERNAL-COMBUSTION ENGINE.

Application filed December 5, 1919. Serial No. 342,742.

*To all whom it may concern:*

Be it known that I, JAMES W. MOWBRAY, a subject of the King of Great Britain, residing at Windsor, county of Essex, Province of Ontario, Canada, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

This invention relates to internal combustion engines, and its object is an engine of the four-cycle or stroke type utilizing fuel and air intake valves and exhaust valves operating in conjunction with the piston to control the intake and exhaust ports of the explosion chamber whereby a simplicity of construction is attained and consequent reduction in the liability of disarrangement of the relationship of the several parts. A further object is an engine of the character stated in which air is introduced during the introduction of the explosion charge, the oxygen of which assists in the combustion in the explosion chamber and prevents carbon deposits. Another object is an engine of the character stated having a valve controlling the exhaust port and operating in conjunction with the air and fuel intake ports which are so arranged as to operate in a manner to introduce air after the fuel intake port has been opened and segregating a part of the fuel charge in its original state and igniting the same to ignite the remaining charge within the chamber. A further object of the invention is a four-stroke internal combustion engine in which the fuel charge is introduced by a vacuum released to the intake conduit near the bottom of the intake stroke of the piston. These and other objects and the several novel features of the invention are hereinafter more fully described and claimed and the preferred form of construction is shown in the accompanying drawings in which—

The figure is a section through the cylinder and showing only part of the crank case.

The engine is provided with the usual crank case 1 which is provided with a cylinder 2. A crank 3 of ordinary form is provided connected with the piston 4 by means of the usual connecting rod 5. The cylinder is provided with a water jacket 6 about the upper end thereof after the usual manner and an exhaust port 7 is provided in the cylinder head. The cylinder is also provided with a fuel intake port 8 intermediate in its length connected with which is the usual intake manifold 9. On the opposite side of the fuel intake port 8, the cylinder is provided with a port 10 open to atmosphere. This port 10 is the air intake port and is one-half the size of the fuel intake port 8, the lower edge of the fuel intake port 8 and air intake port 10 being on the same level. Adjacent the air intake port 10 and adapted to close the said port is what I have termed a piston valve 11 fitting the small cylinder 12 at the lower end of the cylinder. On the opposite side of the cylinder and adapted to close the fuel intake port 8 is a piston valve 13. The two valves 11 and 13 have stems 14 and 15 which ride on cams 16 and 17 respectively driven by means of gears 18 and 19 which have large sprockets connected therewith driven by chains 20 and 21 from the crank shaft as indicated in dotted line in the figure. It is to be noted that by the driven means just described, the cams 16 and 17 are driven in a clockwise direction of rotation. The valve 11 is provided with a rod or shaft 22 extending thereabove and directed in its movement by the guide 23 on the exterior of the cylinder 2 at the upper end. The rod 22 is connected to a lever or beam 24 by means of a screw 25 secured in the end of the said rod or shaft 22 and riding in a slot 26 in the said beam. This beam is supported at its center on an ear or bracket 27 formed integral with the cylinder head and at the opposite end is pivotally connected to the stem 28 of the exhaust valve 29. About this valve 29 and tending to hold the said valve closed is a compression spring 30. The piston head is provided with a baffle 31 which tends to retain a portion of the rich gas entering through the fuel intake port 8 and carry it to the spark plug 32 which ignites this gas and thereby ignites the remaining gas in the cylinder. The purpose and result of the use of the baffle in the construction here shown differs materially from that of the two-cycle type in that at the time of fuel intake, the vacuum resulting from the complete downward stroke of the piston is released to the fuel intake and also to the air intake on the opposite side of the piston from the fuel intake. The position of the fuel and air intake ports respectively being such that the fuel intake port is first opened by a movement of the piston and subsequently the air intake port is opened. The fuel intake manifold is subjected first to the full vacuum produced and as the vacuum becomes reduced by inflow of fuel but prior to the satisfaction of the vacuum created in the chamber, the air intake port is then opened. The baffle 31 is positioned between the two ports 8 and 10 and really provides a pocket about the fuel intake port in which the introduced fuel charge is undiluted by flow of air into the cylinder through the port 10. On the upward stroke of the piston to position indicated this undiluted charge between the baffle and face of the surrounding cylinder is brought contiguous to the spark plug and is fired. The firing of this rich mixture fires the entire charge. Preferably the engine is operated to provide a fuel charge that is readily ignitable and not too "lean" or too "rich." As will be understood the introduction of air through the intake port 10 tends to lean the mixture in the cylinder and if the entire charge were so lean or weakened it would not continuously ignite properly. By providing a pocket or space in which a mixture of the proper proportions is retained, the firing of the segregated charge fires the entire charge. By such arrangement it is possible to fire a charge with an over percentage of oxygen which supports the combustion in the chamber and prevents carbon deposits therein and also results in considerable economy in use of fuel.

The operation of the engine is as follows: Let it be supposed that the fuel has been compressed in the explosion chamber 33. It is then fired by the spark plug 32 while the parts are in the position indicated in full lines in the figure, the exhaust valve being closed at this time. The piston then travels downward on its power stroke and it will be noted that the intake ports 8 and 10 are open and the exhaust valve is held closed by reason of the said valve stem riding on the low part of the cams 16 and 17 as before described. The relation of rotation of the crank shaft to the cam shaft is 2 to 1 and therefore during travel of the piston from the position shown in full lines in the figure to the position shown in dotted lines in the bottom of the cylinder the cams rotate a quarter of a turn which brings the high points 34 of the cams beneath the valve stems 14 and 15 just prior to conclusion of the power stroke. By this means the air intake and fuel intake ports 10 and 8 are closed just prior to uncovering thereof by the piston. It will be noted by the arrangement of the rod 22, beam 24, and exhaust valve 29 that when the intake ports are closed the exhaust port is open. During the next quarter revolution of the cams and exhaust stroke of the piston the exhaust valve is held open and the intake valves are held closed by the high parts 35 of the said cams. As the piston again reaches the upper position at completion of the exhaust stroke the piston valve stems pass from the high portion of the cams thereby closing the exhaust port and opening the intake port. As the piston travels downward on the next succeeding stroke, a vacuum is produced in the explosion chamber 33 which is partially satisfied by opening of the fuel intake port 8. When the fuel intake port 8 is about half open, the air intake port 10 is opened which with the fuel intake port 8 completely satisfies the vacuum in the explosion chamber. As hereinbefore described, a rich mixture of gas is retained between the baffle 31 and adjacent cylinder wall which is carried to the spark plug on the next succeeding stroke. It will be noted that owing to the low portions of the cams 16 and 17 that the air intake and fuel intake ports are held open and the exhaust port is continuously held closed during the intake and compression strokes. When the piston has again reached the position shown in full lines in the figure the rich gas in the pocket is fired by the spark plug thereby firing the remaining gas in the explosion chamber and the operation continuous as hereinbefore described. So far as the four-stroke motor is concerned, the air intake port is not essential as the engine is operable without such air intake. The parts perform all the functions stated but I prefer to use an auxiliary air intake to provide oxygen to support the combustion in the explosion chamber as heretofore stated in order to provide an engine economical in the use of fuel and practically free from carbon deposits in the cylinder or smoke in the exhaust gases. While I have shown an engine of particular design embodying my invention, it is to be understood that various designs may be utilized within the scope of the appended claims.

Having thus briefly described my invention, its utility and mode of operation, what I claim and desire to secure by Letters Patent of the United States is—

1. In an internal combustion engine of the four-stroke type, a cylinder having an exhaust port at the upper end, a fuel intake port and an air intake port intermediate its length, a piston reciprocable in the chamber and controlling the fuel and air intake ports, a valve for each of the said air and fuel ports operated in the relation of 1 to 2 with the piston, and means connecting the exhaust valve and air valve whereby the closing of the air valve opens the exhaust valve.

2. In an internal combustion engine, of the four stroke type, a cylinder having an exhaust port near the upper end, a fuel intake port intermediate in its length, and an air intake port opposite the fuel intake port, a piston reciprocable within the cylinder, and adapted to uncover the said fuel and air intake ports at the completion of its downward stroke and means for closing the fuel and air intake ports during the exhaust stroke of the piston.

3. In an internal combustion engine of the four-stroke type, a cylinder having an exhaust port near the upper end, a fuel intake port intermediate its length and an air intake port opposite the fuel intake port and approximately one-half the size thereof, a piston reciprocable within the cylinder and a piston valve for each of the fuel and air intake ports.

4. In an internal combustion engine of the four stroke type, a cylinder having an exhaust port near the upper end, a fuel intake port intermediate in its length and an air intake port substantially opposite the fuel intake port, a piston reciprocable within the cylinder and adapted at completion of its downward stroke to uncover the fuel and air intake ports, the two ports being so positioned that the air intake port is open subsequent to the fuel intake port and a wall on the said piston separating the flow from the two ports into the cylinder.

In testimony whereof, I sign this specification.

JAMES W. MOWBRAY.